United States Patent
Kennedy et al.

(10) Patent No.: US 11,681,488 B2
(45) Date of Patent: Jun. 20, 2023

(54) COLLABORATIVE DISTRIBUTED WORKSPACE USING REAL-TIME PROCESSING NETWORK OF VIDEO PROJECTORS AND CAMERAS

(71) Applicant: INTERNATIONAL DATACASTING CORP., Kanata (CA)

(72) Inventors: Luke Kennedy, Kanata (CA); Rodney Allan, Kanata (CA)

(73) Assignee: INTERNATIONAL DATACASTING CORP., Kanata (CA)

( * ) Notice: Subject to any disclaimer, the term of this patent is extended or adjusted under 35 U.S.C. 154(b) by 0 days.

(21) Appl. No.: 17/679,428

(22) Filed: Feb. 24, 2022

(65) Prior Publication Data

US 2022/0269469 A1   Aug. 25, 2022

Related U.S. Application Data

(60) Provisional application No. 63/152,970, filed on Feb. 24, 2021.

(51) Int. Cl.
G06F 3/14     (2006.01)
G06Q 10/10    (2023.01)
H04N 23/60    (2023.01)

(52) U.S. Cl.
CPC ......... G06F 3/1454 (2013.01); G06Q 10/103 (2013.01); H04N 23/60 (2023.01)

(58) Field of Classification Search
CPC combination set(s) only.
See application file for complete search history.

(56) References Cited

U.S. PATENT DOCUMENTS

| | | | |
|---|---|---|---|
| 9,995,936 B1* | 6/2018 | Macannuco | G06F 3/013 |
| 2012/0262485 A1* | 10/2012 | Raghoebardajal | G06T 7/11 |
| | | | 345/633 |
| 2012/0320157 A1* | 12/2012 | Junuzovic | H04N 9/3194 |
| | | | 348/46 |
| 2017/0285874 A1* | 10/2017 | Mueller | G06F 3/0416 |
| 2019/0297319 A1* | 9/2019 | Schmollgruber | H04N 13/271 |
| 2020/0037872 A1* | 2/2020 | Shiba | G01B 9/02078 |
| 2020/0126303 A1* | 4/2020 | Kim | G06T 19/006 |
| 2021/0306389 A1* | 9/2021 | Kulbida | H04L 65/4015 |

* cited by examiner

*Primary Examiner* — William Boddie
*Assistant Examiner* — Alecia D English
(74) *Attorney, Agent, or Firm* — Ryan W. Dupuis; Kyle R. Satterthwaite; Ade & Company Inc.

(57) ABSTRACT

The system provides multiple locations with specialized video projector/camera pairs connected by a communication network and real-time video processing services to facilitate distributed collaboration of a shared workspace. Each location will have local objects unique to that location and all locations will receive a combined video composite stream bringing all remote local objects into a shared collaborative space. The system according to the present invention overcomes the effect of video echo, or alternatively referred to as infinite images by compositing image data from other workstations that only relates to real content on the working surface of the workstation and not projected content.

3 Claims, 7 Drawing Sheets

COLLABORATIVE DISTRIBUTED WORKSPACE USING REAL-TIME PROCESSING NETWORK OF VIDEO PROJECTORS AND CAMERAS

This application claims the benefit under 35 U.S.C. 119(e) of U.S. provisional application Ser. No. 63/152,970, filed Feb. 24, 2021.

FIELD OF THE INVENTION

The present invention relates to a collaborative distributed workspace system comprising a camera and a projector at each one of a plurality of workstations communicating with one another over a network for projecting content at each workstation that has been captured by cameras at other workstations.

BACKGROUND

Using a camera and projector in a distributed collaborative environment leads to infinite images, also known as video echo. The output of video echo are infinite images which is the same thing encountered with video feedback. Infinite images are a familiar problem to persons who have ever tried to share their desktop with their video conferencing software open. Video echo however from a conceptual perspective is the same as audio echo except with video. This is much the same as audio echo on a conference call. Audio echo is a problem because it leads to infinite loop which eventually causes a high pitch squeal.

SUMMARY OF THE INVENTION

The present invention seeks to provide a collaborative distributed workspace system comprising a camera and a projector at each one of a plurality of workstations that communicate with one another over a network for projecting content at each workstation that has been captured by cameras at other workstations. In one example, the system can be used for remote table top gaming.

More particularly the present invention provides multiple locations with specialized video projector/camera pairs connected by a communication network and real-time video processing services to facilitate distributed collaboration of a shared workspace. Each location will have local objects unique to that location and all locations will receive a combined video composite stream bringing all remote local objects into a shared collaborative space.

The system according to the present invention overcomes the effect of video echo, or alternatively referred to as infinite images, by various methods.

In one example, video echo can be overcome without any specialized hardware as the projector remains always projecting and the camera remains always capturing and software is instead used to generate projector image data from filtered or processed image data from the cameras. The camera captures a frame of real and projected pixels. The solution to the video echo problem is to separate out real pixels from projected pixels and only transmit real pixels to the other remote workstations. The real space/plane is all of the pixels that belong to real objects. The projected space/plane is all of the pixels that belong to the projections.

In another example, a projector and camera pair are operated in tandem such that the projector is not projecting when the camera is capturing its image. This is done in such a way that there is no flicker and the image is clear using hardware synchronization. In this instance, separating out the real plane from the projected plane is accomplished by simply not capturing any projected pixels to provide the best separation but also the most expensive since it requires hardware synchronization and a high-quality camera and projector.

According to a first aspect of the present invention there is provided a collaborative distributed workspace system comprising:

a plurality of workstations, each workstation comprising a working surface, a projector arranged to project a prescribed image for the workstation onto the working surface of the workstation, and a camera arranged to capture image data associated with the working surface of the workstation; and a controller comprising a workstation processing unit associated with each workstation;

for each workstation, the controller being arranged to:
(i) process the captured image data associated with the working surface of the workstation to distinguish a real image portion representing real content on the working surface of the workstation within the image data captured by the camera of that workstation from other image portions within the image data captured by the camera of that workstation; and
(ii) generate the prescribed image for the workstation based at least in part upon the real image portion representing said real content on the working surface of other workstations among said plurality of workstations.

The controller may be further arranged, for each workstation, to: (i) process the captured image data associated with the working surface of the workstation to distinguish real pixels representing the real image portion from projected pixels representing projected content that has been projected onto the working surface of the workstation; and (ii) generate the prescribed image for the workstation based at least in part upon the real pixels from other workstations among said plurality of workstations.

The controller may be further arranged, for each workstation, to identify the real pixels by comparing brightness of captured pixels among the image data captured by the camera of that workstation to a brightness threshold and determining the captured pixel to be a real pixel if the brightness is darker than the brightness threshold. The brightness threshold may be defined as a gradient of brightness values associated with a respective column of the captured pixels whereby the captured pixels are compared to corresponding brightness values of the gradient in order to determine if the captured pixels are real pixels. The controller is preferably further arranged to calculate the multiple thresholds of the gradient by extrapolating between an upper brightness value and a lower brightness value derived from captured pixels at opposing ends of the column of captured pixels.

The controller may be further arranged, for each workstation, to: (i) define groupings of real pixels that are connected to one another as a real object on the working surface of the workstation; and (ii) generate the prescribed image for the workstation such that a blank image is projected onto the real object.

The controller may be further arranged, for each workstation, to: (i) compare captured pixels from the camera of the workstation to corresponding pixels of the prescribed image to be projected from the projector of the workstation to determine a brightness difference; and (ii) adjust the brightness threshold used to identify the real pixels if the brightness difference exceeds an ambient light threshold.

According to a second aspect of the invention there is provided a collaborative distributed workspace system comprising:

(i) a plurality of workstations, each workstation comprising:
a working surface;
a projector arranged to project a prescribed image for the workstation onto the working surface of the workstation; and
a camera arranged to capture image data associated with the working surface of the workstation; and
(ii) a controller comprising:
a workstation processing unit associated with each workstation;
each workstation processing unit being arranged to communicate the captured image data from the camera at the associated workstation to the workstation processing unit of other workstations;
each workstation processing unit being arranged to operate the projector of the workstation alternately between a first mode projecting the prescribed image for the workstation onto the working surface of the workstation and a second mode in which the prescribed image for the workstation is not projected;
the prescribed image for each workstation being generated by the controller in real time based at least in part on the captured image data received from other workstations; and each workstation processing unit being arranged to operate the camera of the workstation to capture image data only when the projector is in the second mode.

The system described herein effectively prevents the problem of video echo as described above. The system ensures that the camera never captures a frame with the projection of images from the other sites. It should only capture images of what is physically present in the local collaboration space. This is done according to a first aspect of the invention by interleaving the projector frames with the camera capture frames. In other words, when the camera is capturing its frames there is no projection. In order for the solution to be usable, it must result in real time video streams with little processing delay, no user-detectible video flicker, and high-quality camera images despite in low-light conditions. There is more than one specific method that could be used to implement this. Three examples of the first aspect of the present invention as described in the following:

Method 1: Camera and Projector Synchronization. The projector is configured to at a high frame rate and then every other frame is "blanked out". The method of blanking out could be to turn every pixel off or to match the light intensity of the actual frame such that it would provide good light for the camera. The controller would then signal the camera to capture its frame when the projector is blanked out.

Method 2: Camera and Projector with Light valves. Take two light valves that are opposite time frames and set them to alternate at the projector frame rate, for example somewhere greater than 30 Hz. Put one light valve in front of the camera lens and another light valve in front of the projector lens. Since the light valves are configured to operate at opposite time frames the projector will always be blocked when the camera is capturing.

Method 3: Camera and Projector with 1 LC (liquid crystal) Shutter. In this instance, the LC shutter is placed in front of the projector. The projector outputs a signal every frame, the signal is processed and then sent to the LC shutter and Camera. Upon receipt of the processed signal the LC shutter is closed, and the camera is synchronized to capture images only when the LC shutter is closed.

Preferably the working surface of each workstation is arranged to support objects thereon and the camera of each workstation is arranged to capture the supported objects as the image data.

The controller may be arranged to (i) distinguish between a real image portion representing real content on the working surface within the image data captured by the camera from other image portions including at least in part a background image portion representing the working surface, and (ii) generate the prescribed image to be displayed by the projector for each workstation based upon the real image portion captured from other workstations among said plurality of workstations.

Each workstation processing unit may be configured to communicate only the real image portion of the captured image data to other workstations.

The prescribed image projected by the projector of each workstation is preferably arranged to be generated by the controller as a composite image based on the captured image data associated with more than one other workstation. The controller may be arranged to generate said composite image by compositing the captured image data associated with the other workstations in respective layers which are overlayed upon one another.

The controller may be further arranged to generate said composite image by overlaying auxiliary image data onto the captured image data associated with the other workstations.

The controller may be further arranged to generate said composite image by (i) identifying conflicting portions of the image data from different layers which conflict with one another and (ii) selecting only one of the conflicting portions to be displayed in the composite image.

When one of the workstations is identified by the controller as a master workstation, the controller may be arranged to select only one of the conflicting portions to be displayed in the composite image by identifying which one of the conflicting portions is associated with the master workstation.

The controller may include conflict resolving criteria stored thereon so as to be arranged to select only one of the conflicting portions to be displayed in the composite image by comparing the conflicting portions to the conflict resolving criteria.

The system may further comprise: (i) the controller further including a centralized processing unit, the centralized processing unit being in communication with each of the workstation processing units over a network; and (ii) each workstation processing unit being arranged to communicate the captured image data from the camera at the associated workstation to the workstation processing unit of other workstations through the centralized processing unit.

In some instances, when the prescribed image projected by the projector of each workstation is based upon a composite image generated by the centralized processing unit using the captured image data associated with the other workstations, the composite image for each workstation, that is generated by the centralized processing unit and transmitted to the workstation processing unit of that workstation, excludes the image data captured at that workstation and entirely defines the prescribed image projected by the projector of that workstation.

In other instances, when the prescribed image projected by the projector of each workstation is based upon a composite image generated by the centralized processing unit using the captured image data associated with the other workstations and the composite image for each workstation, that is generated by the centralized processing unit and transmitted to the workstation processing unit of that workstation, includes the image data captured at that workstation and the workstation processing unit for each workstation is arranged to generate the prescribed image for that workstation by removing the image data captured at that workstation from the composite image.

In some other instances, when the workstation processing unit of each workstation is arranged to receive the captured image data from other workstations, the prescribed image projected by the projector of each workstation is based upon a composite image generated by the workstation processing unit of that workstation using the captured image data associated with the other workstations.

The system may further include a synchronising signal associated with each projector which defines the operation of the projector between the first mode and the second mode thereof, each camera being operable to capture the image data of the associated working surface in response to the synchronising signal indicating that the projector is in the second mode.

In some embodiments, each projector is arranged to project a blank image onto the associated working surface of the workstation in the second mode. The blank image may consist of a uniform colour and brightness. More particularly, the blank image projected by the projector in the second mode represents an average grey level of the prescribed image projected by the projector in the preceding first mode of the projector.

In another embodiment, each workstation further comprises a pair of light valves associated with a lens of the camera and a lens of the projector respectively, in which the light valves are operable at opposing time frames relative to one another such that: (i) in the first mode, the projector is not blocked by the respective light valve of the projector and the camera is blocked by the respective light valve of the camera; and (ii) in the second mode, the camera is not blocked by the respective light valve of the camera and the projector is blocked by the respective light valve of the projector.

In another embodiment, each workstation further comprises a shutter associated with a lens of the projector respectively, in which the shutter is operated between an open state corresponding to the first mode of the projector in which the projector is not blocked by the respective shutter and a closed state corresponding to the second mode of the projector in which the projector is blocked by the shutter.

BRIEF DESCRIPTION OF THE DRAWINGS

Various embodiments of the invention will now be described in conjunction with the accompanying drawings in which.

In the drawings like characters of reference indicate corresponding parts in the different figures.

DETAILED DESCRIPTION

Figure 1:
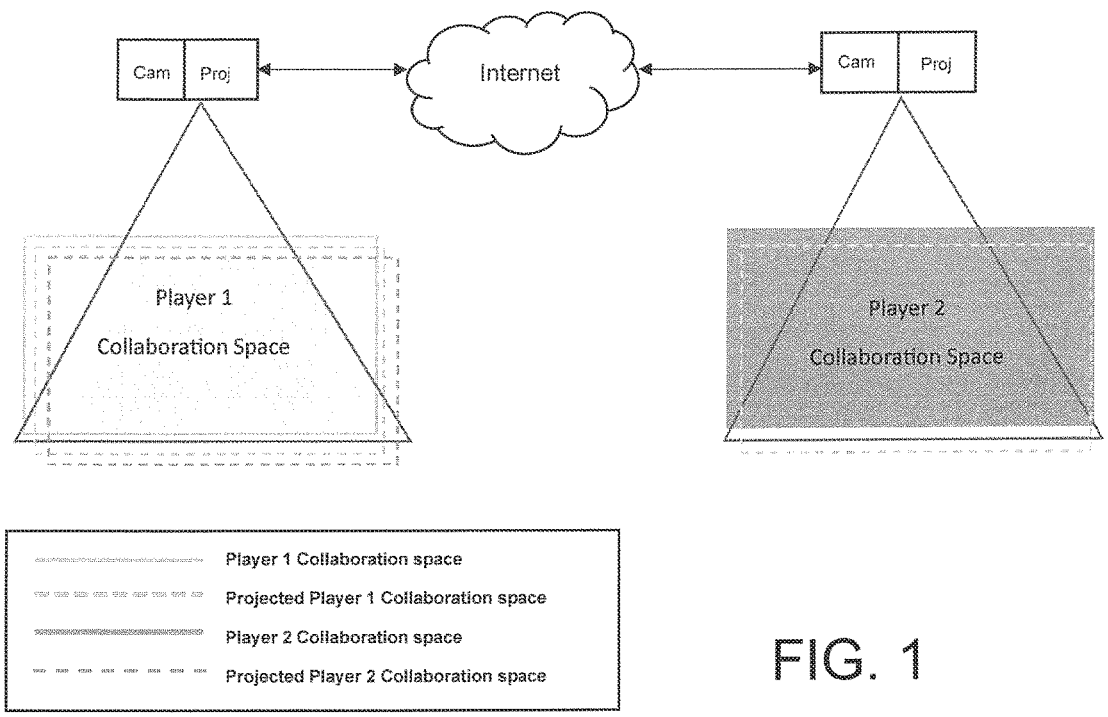
FIG. 1 is a schematic representation of a collaborative workspace before applying video echo cancellation techniques.
Figure 2:
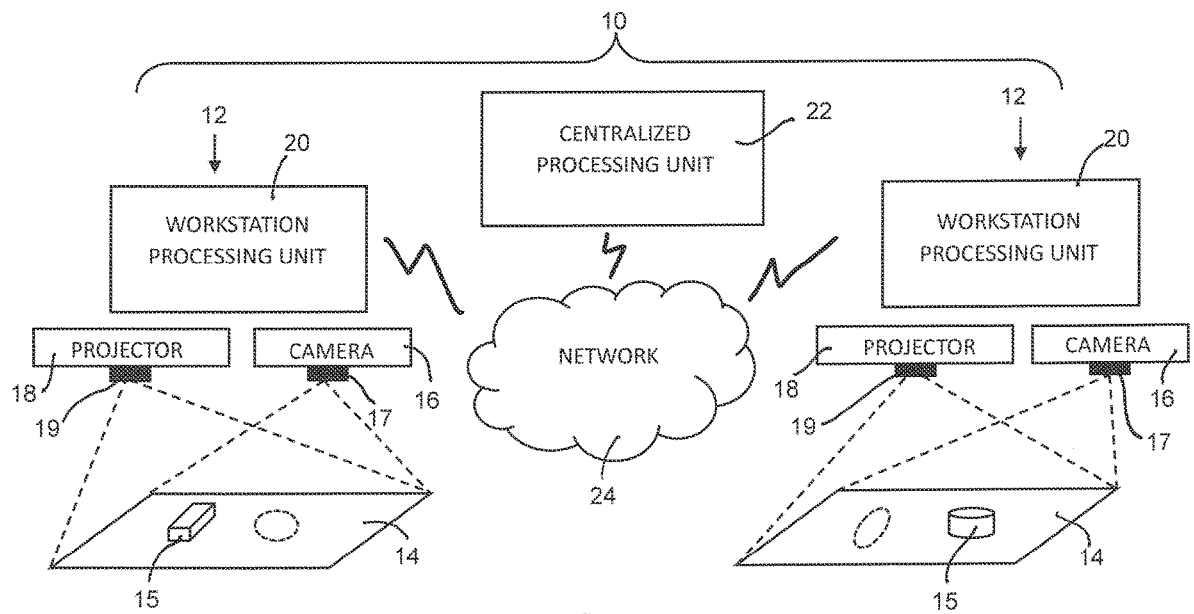
FIG. 2 is a schematic representation of the collaborative distributed workspace system according to the present invention comprising workstations being shared with one another in which actual content at each workstation is shown in solid line and in which projected content is shown in broken line.

In a collaborative distributed workspace, if no video echo cancellation is implemented infinite images will occur. FIG. 1 illustrates an example in which User 1 has a camera that is capturing his collaboration space. This image is transferred to User 2 who projects User's 1 image onto their collaboration space. Now User 2's camera captures his physical collaboration space plus the projected image of User 1's space, and sends it to User 1's projector. As a result, User 1's camera now captures his physical collaboration space plus the projected image of User 2's space, which includes a projection of User 1's own space, thus creating infinite images if no video echo cancellation is provided.

Turning now more particularly to FIGS. 2 through 8, according to a first embodiment of the present invention a collaborative distributed workspace system 10 is provided which eliminates video echo. In each instance, the system 10 generally comprises a plurality of workstations 12 that each provides support to a respective user. Each workstation includes a working surface 14 upon which projected images can be displayed, a respective camera 16, and a respective projector 18.

The working surface 14 may be an upright surface supporting written content thereon, or more preferably according to the preferred embodiment the working surface is upwardly facing or substantially horizontal so as to be arranged to support various objects 15 thereon. The working surface is typically solid and uniform in colour so as to enable the working surface to be readily distinguished from objects supported thereon. In a preferred arrangement, the working surface comprises a structurally solid plain white surface.

The camera 16 is a video camera capable of capturing a sequence of images or video frames of the content on the working surface. More particularly, the camera includes a lens 17 oriented towards the working surface for capturing image data from the working surface.

The projector 18 is a video projector capable of projecting a sequence of images or video frames corresponding to one or more prescribed images to be displayed on the working surface 14. The prescribed image is based in part or fully upon image data captured by the cameras of other workstations as described in further detail below. The projector also includes a lens 19 oriented towards the working surface for projecting the prescribed image onto the working surface.

Each workstation 12 further includes a workstation processing unit 20 in the form of a computer device including a computer processor and a memory storing programming instructions thereon executable by the processor to execute the various functions of the workstation as described herein. The workstation processing unit 20 of each workstation is in communication with the workstation processing units 20 of the other workstations 12 for the exchange of captured image data as described in the following. Each workstation processing unit 20 is further operatively connected to the camera 16 and the projector 18 of the associated workstation for controlling the operation thereof.

In preferred embodiments, the system 10 further includes a central server defining a centralized processing unit 22 that communicates with each of the individual workstation processing units 20 over a suitable communications network 24, for example the Internet. In this manner, each workstation processing unit 20 communicates with other units 20 over the communications network 24 through the central server 22. The centralized processing unit is a computer device including one or more processors, one or more computer memories, and programming instructions stored on the memory to be executable by the one or more processors to execute the various functions of the centralized processing unit as described herein. The central server defining the centralized processing unit 22 may be a singular computer or a plurality of devices distributed over a network. All of the workstation processing units 20 and the centralized processing unit 22 collectively define a controller of the system 10 which controls the operation of the cameras and projectors as well as the exchange of information between the stations.

In further embodiments, one of the workstation processing units 20 functions as a master controller that incorporates all of the functionality of the centralized processing unit 22 therein. In yet further arrangements, each of the workstation processing units 20 may include programming instructions thereon enabling that unit to function as the master controller relative to other workstation processing units 20 or a secondary controller when one of the other workstations functions as the master controller.

Figure 3:
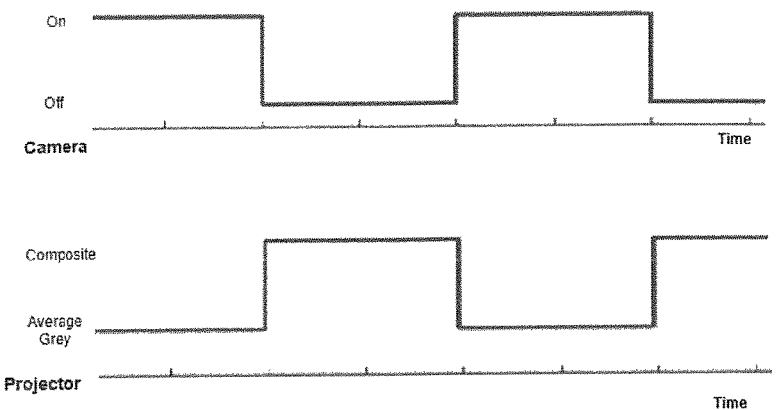
FIG. 3 is a graphical representation of a synchronizing signal for capturing image data by the camera only when the projector is not displaying captured image data from other workstations.

Operation between the camera 16 and the corresponding projector 18 at any given workstation is synchronized by the workstation processing unit 20 of that workstation. In this regard, a synchronizing signal as illustrated in FIG. 3 is generated by the workstation processing unit 20 or the projector 18 for dictating the operating mode of the projector alternately between a first mode and a second mode thereof at a prescribed video frame rate. In the first mode of operation, the projector is arranged to project the prescribed image for that workstation onto the working surface of the workstation. In the second mode the prescribed image is not projected onto the working surface. This can be accomplished by various means as described in the following.

According to some embodiments, the workstation processing unit 20 defines a blank image to be projected by the projector in the second mode in alternating frames with prescribed images that are projected in the first mode. The blank image may be produced by turning off the projector entirely, or projecting a blank image which is uniform in colour and brightness across the working surface onto which it is projected. In a preferred embodiment, the blank image is calculated to represent an average grey level of the previous prescribed image projected in the first mode within the preceding frame among the sequence of video frames projected by the projector.

In an alternate embodiment, the operating mode of the projector is determined by a light valve (not shown) which is operatively supported on the lens of the projector to respond to the synchronizing signal in a manner that opens the light valve to allow projection of the prescribed image onto the working surface in the first mode, while closing the light valve to block projection of the prescribed image onto the working surface in the second mode of the projector.

The camera 16 is operated in response to the synchronizing signal such that the camera only captures image data in the second mode of the projector when the prescribed image is not projected by the projector onto the working surface. The workstation processing unit 20 may operate the camera such that image data is only collected in the second mode of the projector or alternately the captured video frames in the first mode of the projector are removed or replaced with blank images.

When a light valve is used to control operation of the projector between first and second modes, a corresponding light valve (not shown) is also supported on the lens of the camera in which the light valve on the camera is operated at an opposing time frame relative to the light valve on the associated projector. In this manner the light valve on the camera is closed when the light valve on the projector is open, and conversely the light valve on the camera is open when the light valve on the projector is closed. In this manner the camera merely captures a blank image of the closed light valve in the first mode of the projector.

Figure 9:
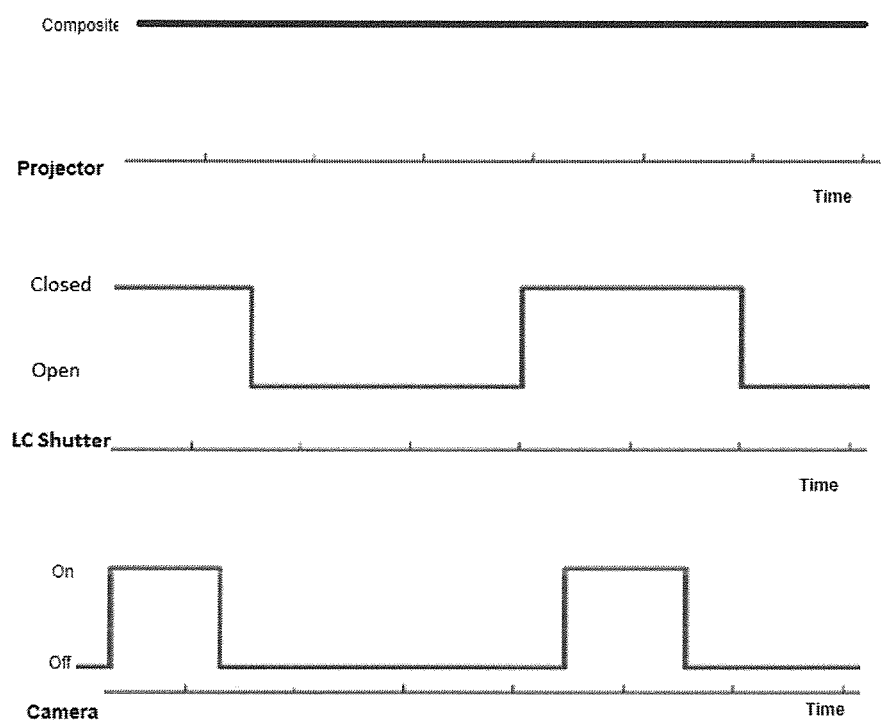
FIG. 9 is a graphical representation of a synchronizing signal for capturing image data by the camera only when the projector is not displaying captured image data from other workstations according to a further embodiment of the system.

In a further embodiment, a LC (liquid crystal) shutter (not shown) is supported on the lens 19 of the projector 18 at each workstation. In this instance, the operating mode of the projector is determined by the LC shutter which is operated by the controller 20 of the workstation to respond to the synchronizing signal as represented in FIG. 9. In this manner the controller processes the synchronizing signal and operates the shutter according to the synchronizing signal that defines the operating mode of the projector. Accordingly, the controller opens the LC shutter to a transparent state to allow projection of the prescribed image onto the working surface in the first operating mode of the projector, while closing the LC shutter to an opaque state to block projection of the prescribed image onto the working surface in the second operating mode of the projector. The projector can thus be configured to project continuously by outputting a signal at every frame in a video sequence of frames. The camera 16 at each workstation is also controlled by the controller 20 according to the synchronizing signal so that the camera is synchronized to capture images only when the LC shutter is closed corresponding to the second mode of the projector. As represented in FIG. 9, at each occurrence of the projector being in the second mode of operation, the camera may be operated to capture images for a duration that is less than the duration that the projector is in the second mode.

In all embodiments, one or more processing units of the overall controller generates the prescribed image for each workstation. This may involve processing steps at the workstation where the prescribed image is to be displayed, at a centralized processing unit 22 defined by a central server, or any combination thereof.

Generating prescribed image content to be projected by the projectors of each workstation begins by first capturing image data of the working surface of each workstation using the respective camera in the second mode of the respective projector as noted above. The captured image data typically includes an identifiable background image portion, for example non-real pixels that representing the uniform white colour of the working surface, and a foreground image portion consisting of various content that is visually distinguishable from the background image portion by the controller, for example writing or objects supported on the working surface so that the foreground image portion comprises real pixels in a real image plane representing real content on the working surface. When projecting a blank image onto the working surface in the second mode of operation, the background image portion may consist of projected pixels in a projected image plane defined by the (blank) image projected onto the working surface by the projector so that identification of the real pixels in the foreground image portion involves distinguishing between real pixels that represent real content on the working surface from projected pixels representing projected content that is projected onto the working surface.

In some embodiments, the workstation processing unit 20 at the workstation where the image data is captured performs the processing steps of identifying the foreground portion within the captured images and storing only the foreground portion as an image layer at the local workstation, while the background portion is removed as a discarded image layer. It is only the foreground portion of the captured image data that is required to be transmitted to the other workstation processing units 20, for example through the centralized processing unit 22.

The prescribed image to be projected onto the working surface at each workstation is based only on the foreground portion of the captured image data from the other workstations. In the instance where only two workstations are communicating with one another, the prescribed image to be displayed at one workstation may be entirely defined by the foreground portion of the image data captured at the single other workstation.

More commonly, when more than two workstations are in communication with one another to collaborate with one another, the prescribed image to be projected onto the working surface at each workstation is a composite image based on foreground portions of captured image data from all of the other workstations composited together while excluding the content captured by the camera at that workstation.

The step of compositing image data from multiple workstations into a prescribed image for projecting at one workstation can be accomplished at various levels.

In one embodiment, for example if no centralized processing unit 22 is utilized and a plurality of workstation processing units 20 merely communicate with one another, then the compositing of image data from other workstations may be accomplished at the workstation where the prescribed image is to be projected onto the working surface. In this instance, each workstation communicates the foreground portion of the captured image data by its camera to all of the other workstations. At the receiving end, the workstation processing unit 20 at each workstation receives captured image content from all of the other workstations and adds the image layers together to define the prescribed image to be projected by the projector at that workstation.

Figure 4:
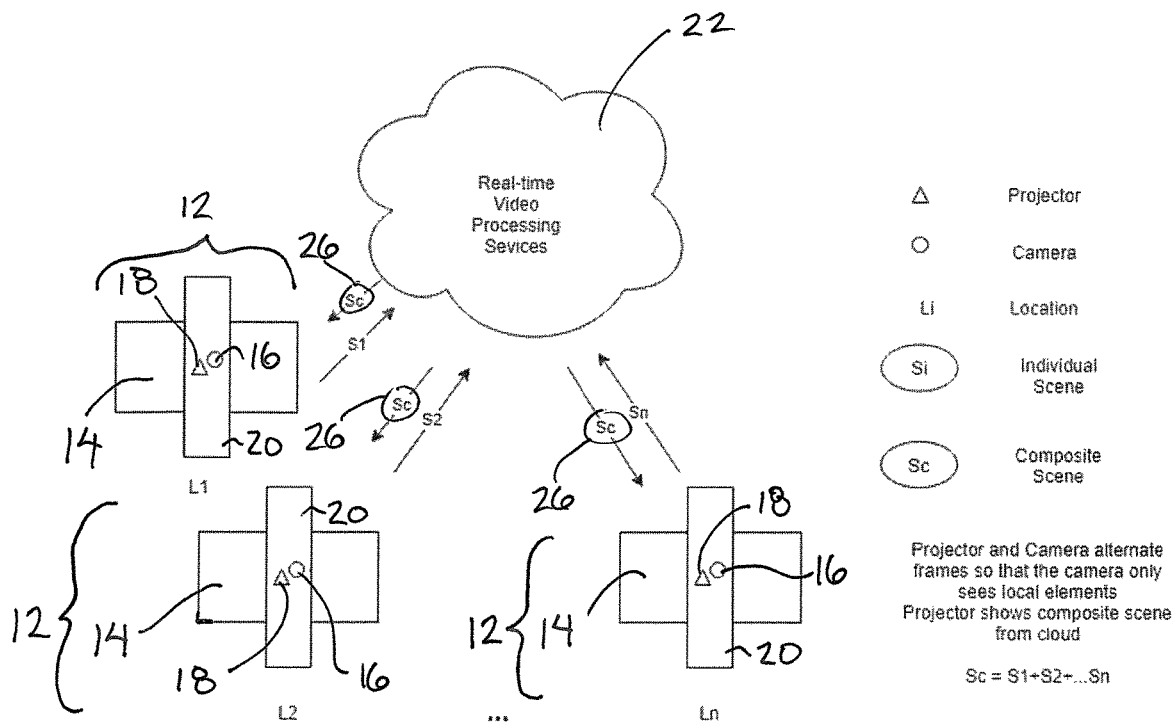
FIG. 4 is a schematic representation of the collaborative distributed system according to the present invention according to a first embodiment of the image compositing process.

In another embodiment, when a centralized processing unit 22 is provided, all of the individual workstation processing units 20 merely transmit captured image data from their cameras respectively to the centralized processing unit 22 which then combines the image data from all of the workstations into a common composite image 26 which is subsequently transmitted back to each of the individual workstation processing units 20 at the respective workstations. The workstation processing unit 20 at each workstation that receives the common composite image from the centralized processing unit 22 then performs further processing to remove the image layer from the common composite image 26 that corresponds to image data captured locally at that workstation to finally arrive at the prescribed image to be displayed by the projector at that workstation. This example is best represented in FIG. 4 in which a common composite image 26 is shown being transmitted from the centralized processing unit 22 to the workstation processing units 20 of each workstation.

In yet a further embodiment, also when a centralized processing unit 22 is provided, all of the individual workstation processing units 20 again transmit captured image data from their cameras respectively to the centralized processing unit 22. In this instance, the centralized processing unit 20 assembles image layers to form a plurality of unique composite images 28 which are unique to each workstation and which are transmitted to the workstation processing units 20 of the respective workstations. In this instance, the composite image for each workstation that is generated by the centralized processing unit excludes the image data captured from the workstation that the unique composite image is intended for by adding up the image layers from all of the other workstations. In this instance, the composite image received at each workstation entirely defines the prescribed image to be projected by the projector of that workstation with minimal or no further processing of the image being required.

The compositing of image data to form the prescribed images is generally performed in the same manner in all embodiments. Once the foreground portion of the captured image data is identified at each workstation, the image data from each workstation defines a respective image layer and the image data from the relevant workstations are composited by superimposing the relevant image layers to form the composite image. Auxiliary information not captured by cameras but rather generated by the controller at various points within the system may be further incorporated into the composite image as an additional image layer added to the other image layers if additional content is desired to be displayed to the various users at the respective workstations.

In the compositing process, the controller is also able to detect conflicts where portions of image data from one image layer conflict with or occupy the same space as portions of image data from another image layer. The controller is able to identify such conflicting portions within the different image layers and can resolve which of the conflicting portions should be removed and/or which of the conflicting portions should be overlaid upon the others as a top layer to be viewed in the finished composite image, as represented schematically in FIG. 8. In this regard, the controller may include various conflict resolving criteria stored thereon in the form of rules which determine which of the conflicting portions should be removed and which should be overlaid as a top layer in the composite image. Once the conflicting portions of the image data have been identified and compared to the conflict resolving criteria, a resulting prescribed image to be displayed by the projector is determined.

In one example, where one of the workstations is determined to be a host or master workstation, a conflicting portion associated with image data captured by the master workstation may be determined to be the bottom layer overlaid by other image data or the dominant top layer that is viewed above other layers.

Alternatively, as another example if it is determined that one of the conflicting portions is derived from image data captured at the local workstation, all conflicting portions among the image data from other workstations may be removed so as to prevent content within the composite image data from being projected onto an object present on the working surface of the local workstation.

Figure 5:
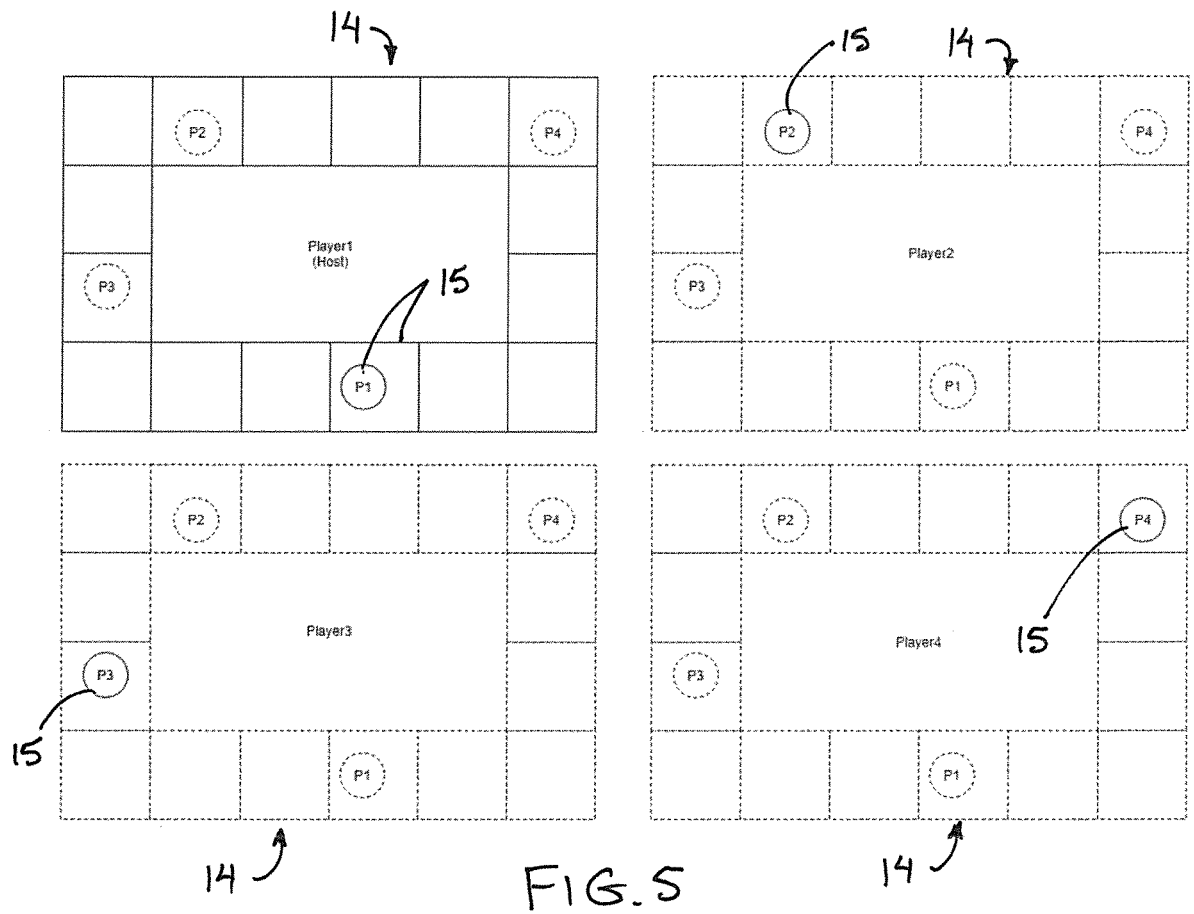
FIG. 5 illustrates an example of the appearance of the working surfaces at four shared workstations in which actual content at each workstation is shown in solid line and in which projected content is shown in broken line.
Figure 6:
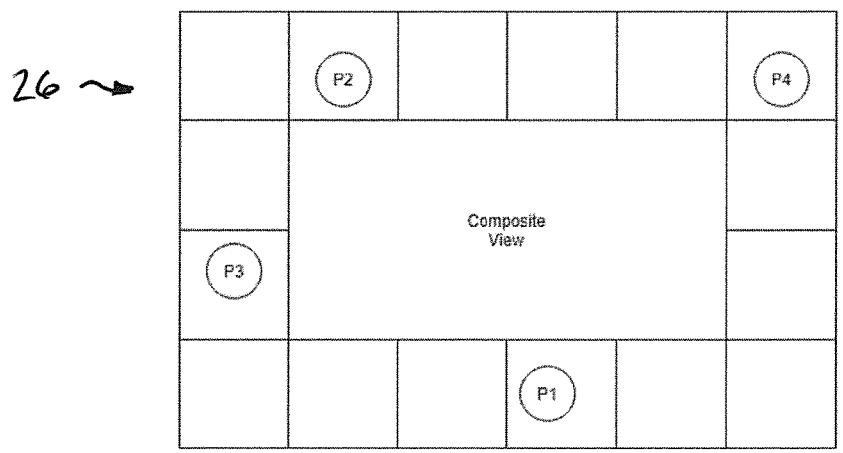
FIG. 6 illustrates a composite image generated by compositing the captured image data from each of the workstations in FIG. 5.
Figure 7:
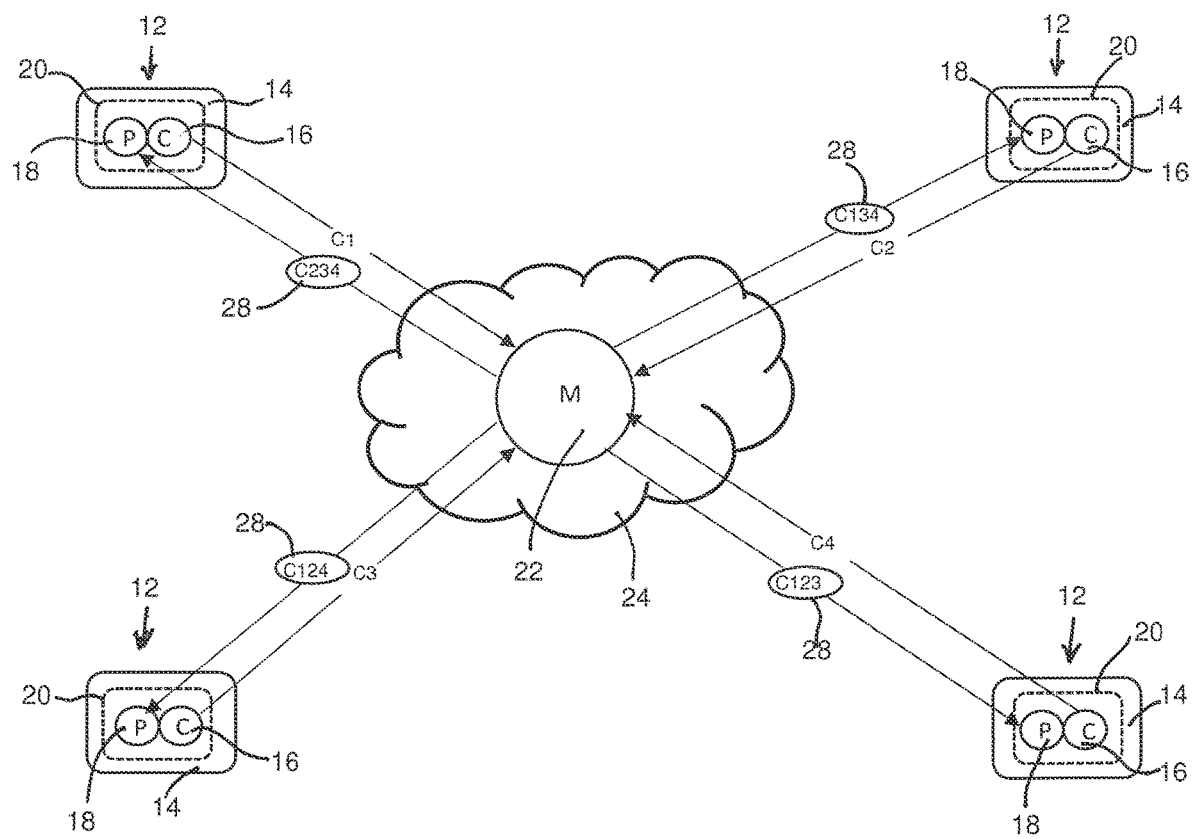
FIG. 7 is a schematic representation of the collaborative distributed system according to the present invention according to a second embodiment of the image compositing process.
Figure 8:
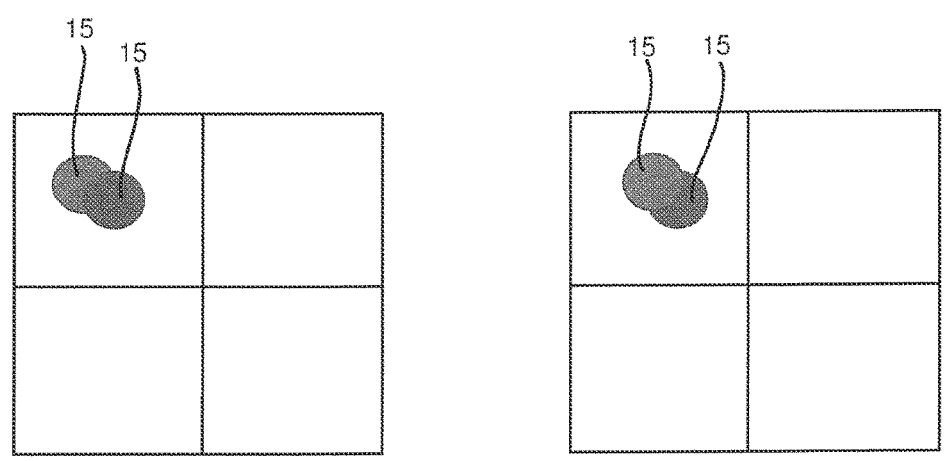
FIG. 8 is a schematic representation of a compositing process in which portions of the image data captured from different workstations conflict with one another and in which the conflict is resolved by overlaying one conflicting portion over another.

An example of four workstations collaborating with one another is shown in FIG. 5 in which the working surfaces of the four workstations are visually represented. Within each working surface, local content or objects are shown in solid line while projected content is shown in broken line. Because the camera at each workstation only captures image data when the projector is not projecting, only the content represented schematically in solid line forms the basis of the captured foreground portion of the image data that is captured by the local workstation processing unit 20 and transmitted to the other workstation processing units 20 through the centralized processing unit 22 as an image layer. In accordance with the embodiment of FIG. 4, the image layers from all of the workstations are combined to define the common composite image 26 as represented in FIG. 6.

As described herein, the present invention embodies a network of camera and projector modules. Each location contains an apparatus that contains a camera and projector whose operation is controlled and synchronized with an embedded computing module which operate together with the following restrictions: (i) The camera cannot capture what is being projected. (ii) The user must not see any flicker from the projector. (iii) The quality (i.e low noise) of the camera image must be adequate in low-light conditions. (iv) The video stream from the camera must be "real-time" for the activity.

All locations send and receive their video streams to real-time network video services. In one embodiment of the services, these participants would connect their locations using broadband public Internet services. The work of composing the composite video stream involves both local and central video processing.

For each session of using this collaborative system, there are a number of processes that must occur. These include: (i) Calibration, (ii) Setup Virtual Table, (iii) Join Table, (iv) Capture and Send Local Objects, (v) Compose composite remote video streams, (vi) Receive and Project Composite Remotes, (vii) Leave Table.

The Calibration Process includes the following steps: (i) The projector projects a known image (eg. Checkerboard) onto the surface, (ii) The camera captures the image, (iii) Using homography the captured image is transformed to match the known image, (iv) The coefficients need to be stored for the capture process. This process can be redone on demand or in some cases automatically based on a self-monitoring parameter The Setup of a Virtual Table (host) generally includes the following steps: (i) Securely connect to network video services, (ii) Uniquely identify this table (session), (iii) Open session to public or limited number of invitees, (iv) Join Table Session, (v) Securely connect to network video services, (vi) Select table to join (or auto join by invite), and (vii) Receive session parameters/composite stream.

The Capture Process generally includes the following steps: (i) Capture image based on sync signal from projector in which the sync signal is used to indicate when the projector is showing the average grey of the previous frame. (ii) Dewarp capture using coefficients calculated in the calibration process. (iii) Extract only the foreground of the captured image. Optionally mark the frame with its source identification and frame number. The marking would be in the active video frame so that encoding and decoding do not affect it. (iv) Send foreground extracted image with optional markings to the compositing process and save a copy locally to be used to possibly remove the local image from the projection during the projector process. The received composite stream may or may not contain the local objects as they may have been included or already extracted. In some optimized scenarios minimize the outgoing stream if no changes are occurring. (At a minimum utilize variable bit-rate encoding).

The Compositing Process includes the following steps: (i) Receive all remote collaboration space streams. (ii) Composite all or optionally only the active streams together. Ensure the master/host collaboration space is the base image. For example the session host will likely have the main game board. (iii) Send composited streams to all users. (vi) Each user stream may be unique due to special requirements of the activity/game. For example some activities/games will require a private overlay containing secret game objects. Also each stream can be unique to not include the local objects that are not required at each location. (v) For some scenarios the composting process could occur at each location. (eg three location game). Note: If objects from different location occupy the same location, the composite layering process will determine which object overlays the other. An advanced central processing feature could highlight this issue but in most cases the player will be easily able to resolve the overlay in a fashion suitable to the game or activity.

The Projector Processes include the following steps: (i) Receive composited video stream from the compositing module. The composited stream will contain all remote collaboration spaces composited. (ii) The projector is setup for a minimum of 60 Hz. Every other frame (30 Hz) will be the composited frame. The frames in-between will be the average grey of the last frame projected. The average grey will be to provide additional light on the local space which reduces overall flicker and improves the user experience. (iii) The projector will send a sync signal to the camera so that the camera can capture during the average grey frame. (iv) Optionally use a light shutter in front of the projector to reduce flicker.

Figure 10:
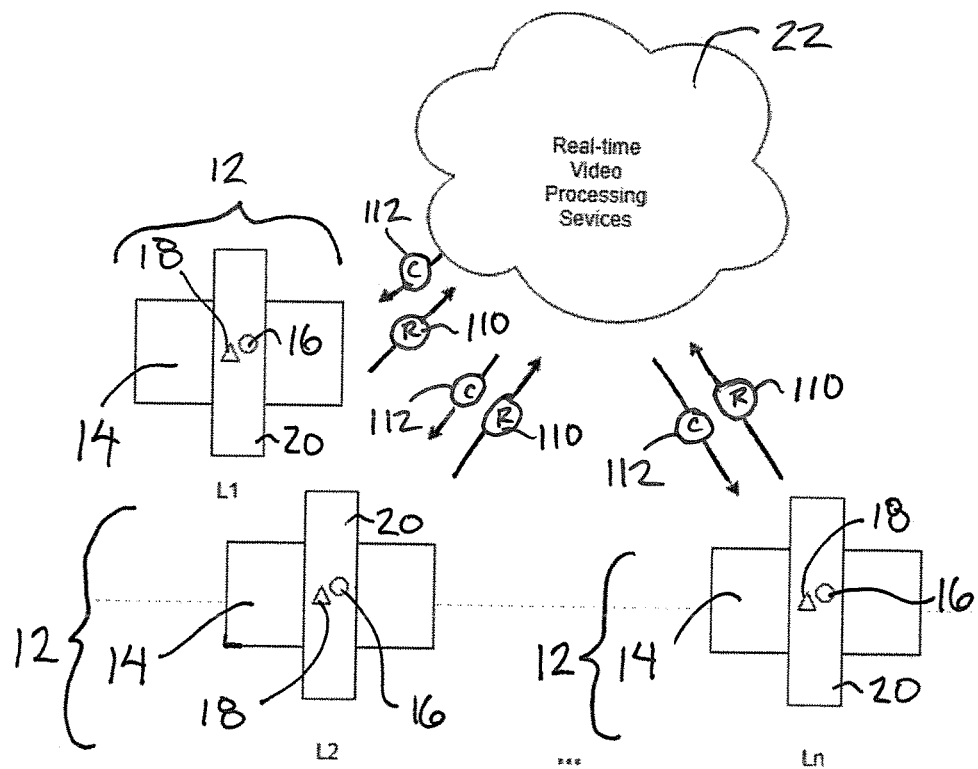
FIG. 10 is a schematic representation of a further embodiment of the collaborative distributed system according to the present invention.
Figure 11:
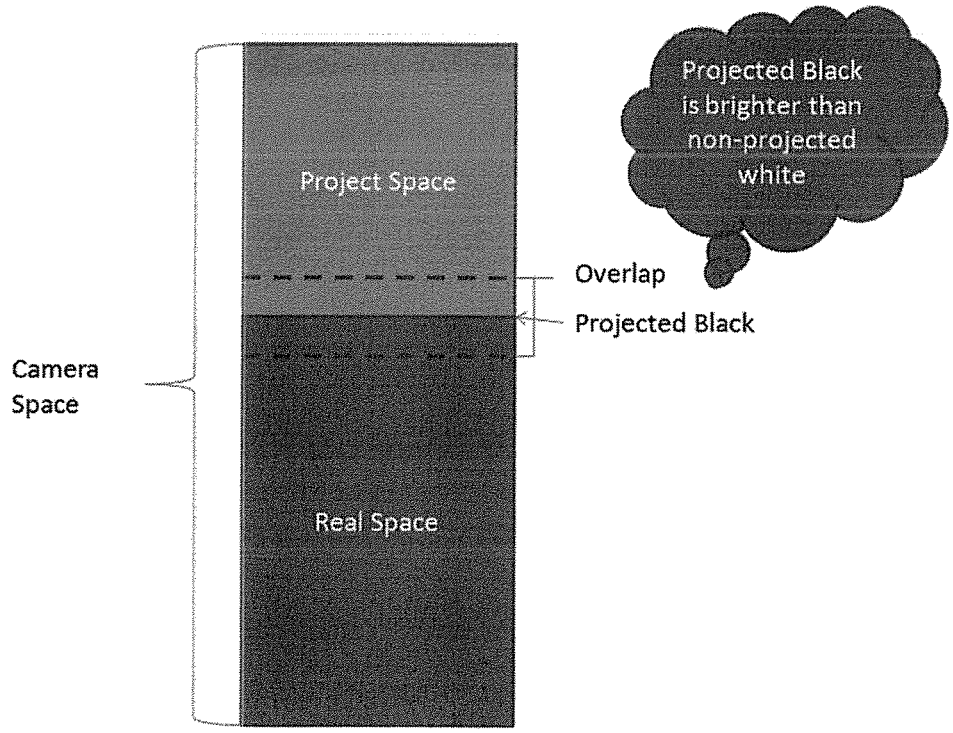
FIG. 11 is a schematic representation of the real pixels and projected pixels captured within the camera space according to the embodiment of FIG. 10.
Figure 12:
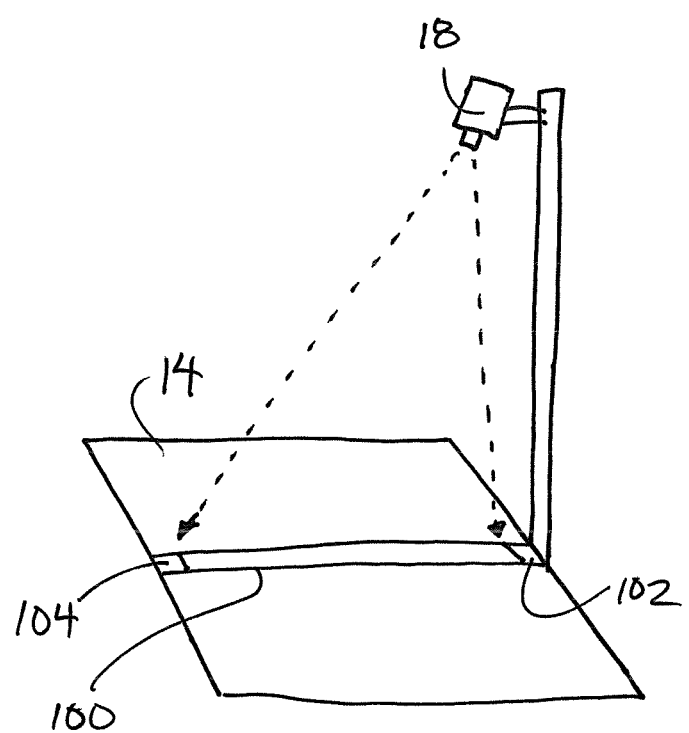
FIG. 12 is a schematic representation of the calculation of the gradient of brightness thresholds used to distinguish real content from projected content within the pixels captured by the camera according to the embodiment of FIG. 10.

Turning now to FIGS. 10 through 12, a further embodiment of the collaborative distributed workspace system according to the present invention will now be described.

In this instance, the hardware of the system is substantially identical to the previous embodiment in that a plurality of workstations 12 are provided which each define a respective working surface 14 suitable for supporting respective objects 15 thereon. Each workstation 12 again comprises a camera 16 and a projector 18 operated by a respective workstation processing unit 20 which in turn communicates with a centralized processing unit 22 over a suitable communication network 24 as described above. The system in this instance is distinguished from the previous embodiments by the operation of the projector to always project the designated prescribed image and the operation of the camera to always capture image data of the workstation continuously. In this manner, some of the projected content that is projected onto the workstation by the projector is captured by the camera. As represented in FIG. 11, the camera space thus captures pixels which include both (i) real pixels representative of real content, for example objects 15 on the working surface 14, that are stored as a real plane or real image portion among the image data, and (ii) projected pixels representative of projected content that is projected onto the working surface 14 and stored as a projected plane or background image portion among the image data. The projected pixels can include projections of real pixels captured from other workstations or blank or black images projected onto the empty work surface by the projector.

In this instance, the controller, that is any one or combination of the workstation processing units 20 and the centralized processing unit 22, generates the prescribed image for each workstation from only the real pixel content captured from other workstations and transmitted through the network 24 by processing and filtering the image data to remove pixels relating to projected content from the captured image data. More particularly, for each workstation, the controller is arranged to process the captured image data associated with the working surface of the working station to distinguish real pixels representing the real image portion of the image data from projected pixels representing projected content that has been projected onto the working surface of the workstation.

As shown in the example of FIG. 10, the real pixel planes 110 from each workstation are transmitted to the centralized processing unit 22, and then composite image data 112 comprised of a composite layering of the real pixel planes 110 from all other workstations is transmitted back to each workstation processing unit 20.

The controller further generates the prescribed image to be projected at the workstation based at least in part upon the composite of the real pixels from other workstations in addition to any optional overlaid data to be presented in the prescribed image for the workstation. The controller further generates the prescribed image by removing pixels conflicting with identified objects on the relevant workstation to be projected onto as described in further detail below.

The controller is primarily arranged to identify the real pixels by comparing brightness of the captured pixels among the image data captured by the camera to one or more brightness thresholds. The controller determines that a captured pixel is a real pixel representing real content if the brightness of the captured pixel is darker than the corresponding brightness threshold associated with that pixel. The brightness threshold is typically defined as a gradient of brightness values ranging between an upper brightness value and a lower brightness value derived from captured pixels at opposing ends of a corresponding column of pixels. For example, as shown schematically in FIG. 12, when the projector 18 is offset towards a first side of the working surface 14, a column 100 is identified within the captured image data extending from a first pixel 102 at the first side of the working surface to a second pixel 104 at the opposing second side of the working surface. Each of the first and second pixels corresponds to a border of the prescribed image being projected onto the working surface where the projected pixel is a black projected pixel (which is actually projected as a dim grey light). Due to the closer proximity between the projector and the first side of the working surface than the proximity between the projector and the second side of the working surface, the first pixel 102 will appear brighter and be used to define the upper brightness value, while the second pixel 104 will appear darker and be used to define the lower brightness value. The controller extrapolates a gradient of brightness values between the lower brightness value of the second pixel and the upper brightness value of the first pixel to effectively define the range of brightness thresholds across the width of the working surface between the opposing first and second sides.

When processing the captured image data, each pixel is analysed by comparing to the corresponding brightness threshold of the gradient that is located at a similar distance along the column of pixels and any captured pixels that are found to be darker than the relevant threshold are determined to be a real pixel and stored within the real plane identifying the real image portion of the captured image data. Darker pixels are presumed to be real pixels on the basis that the pixel is determined to be darker than a black pixel projected onto a white surface according to the upper and lower brightness values only if a real object is present on the work surface that is darker than the white background of the working surface.

The image data is further processed by grouping any identified real pixels together or by systematically sampling adjacent pixels to identify other real pixels adjacent to each located real pixel. The adjacent real pixels are grouped to define identified objects within the image data. That is identified groupings of the real pixels that are connected to one another are defined as real objects on the working surface of the workstation. Any grouped real pixels that are adjacent to identified projected pixels may be determined to be a boundary pixel identifying the perimeter boundary of a real object. A grouping of boundary pixels thus define the perimeter contour of a real object within the captured image data. Once real objects have been identified, the shape and location of the identified object can be tracked and stored so that all other pixels within the perimeter boundary defined by a grouping of boundary pixels can also be determined to be real pixels. The identification of objects within the captured image data provides for correction of small errors in real pixel determination which might otherwise result for isolated pixels.

Once all of the real pixels have been determined at each workstation, the real pixels are stored in a real plane and the real planes from each of the workstations are transmitted centrally to the centralized processing unit. A composite image can then be generated by adding together the various layers resulting from the real planes from the different workstations. As described above with regard to the previous embodiment, any conflicts between real objects from different workstations can also be resolved by applying various conflict resolution criteria also described above with regard to the previous embodiment.

The composite image data resulting from the compositing of the real pixels from the different workstations can be further processed before generating the prescribed image to be projected at each workstation by removing any pixels which may conflict with the location of identified real pixels from the workstation onto which the prescribed image is to be projected. The removed pixels are replaced with a black or blank pixel. In this manner, no content is projected onto the real objects that have been identified at each workstation.

In order to compensate for uneven ambient lighting that may affect the effectiveness of the calculated brightness thresholds for determining real pixels, the controller may be further arranged to validate the brightness thresholds for each workstation by comparing the captured pixels captured by the camera at that workstation to the corresponding pixels of the prescribed image to be projected from the projector at that workstation. The difference in brightness or other differences such as colour variations between the compared pixels can be compared to a defined ambient light threshold to identify any significant discrepancies between the compared pixels. If the ambient light threshold is exceeded, the controller may adjust the brightness thresholds associated with the relevant pixels for which a discrepancy was found.

As described above, the second embodiment of the present invention separates the real and projected planes by using the brightness of individual pixels. Because projectors don't project black and actually project a very dim "grey" light which looks black because of the contrast with the regions around it, when projecting onto a white surface a real white is not as bright as the darkest projected black. On this basis real objects (the real space) can be separated from projected objects (the projected space) by comparing brightness levels.

In a uniformly lit space this method would work without any issues, however in any real-world applications light is not uniformly distributed across a surface which means the real and projected spaces may overlap. The overlap of each space is also dependent on the camera and projector pair which need to be chosen to work together. There are two major sources of light: the projector and the ambient light. The light due to the projector is typically the strongest light and causes real objects to be brighter as well. In order to reduce the effect of the projector light a gradient method is used to compensate for the change in light due to the varying distance of the projector to different portions of the working surface. More particularly, the gradient method is used for selecting the best threshold. The gradient is calculated across each column of the image. The gradient is calculated by subtracting a sample of the brightness (on projected black) of a blurred image at the top (within the border) of the column from a sample at the bottom (within the border). This rate is then used to extrapolate the brightness at pixels in between.

The algorithm scans each image capture row by row and compares each pixel to a threshold and then only sends the pixels that are part of the real plane. This is a raw pixel method.

A variation of this method is the objection detection method. In this case, once a real pixel is found, the system finds the contour of all the real pixels attached to that one and then copies that contour with its area to the output real plane. It then continues scanning pixels row by row ignoring the ones that have already been copied.

Optionally, the projected image can be used to determine if brightness is different then if it was a pure projection. This can accommodate for uneven ambient light. Alternatively, additional lighting may be used, for example a ring light, to provide even ambient light.

An optional method of object detection can be used to detect the contour of an object instead of working on individual pixels. This enables tracking and identifying objects as well as determining if the object is properly detected. The contour detection method is unique in that it is applied to image data comprised of two planes (real and projected pixels).

Self-masking is another method employed by which the projector is set to project black on objects that have been detected.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A collaborative distributed workspace system comprising:
   a plurality of workstations, each workstation comprising a working surface, a projector arranged to project a prescribed image for the workstation onto the working surface of the workstation, and a camera arranged to capture image data associated with the working surface of the workstation; and
   a controller comprising a workstation processing unit associated with each workstation;
   wherein for each workstation, the controller is arranged to:
   (i) process the captured image data associated with the working surface of the workstation to distinguish real pixels defining a real image portion representing real content on the working surface of the workstation within the image data captured by the camera of that workstation from projected pixels representing projected content that has been projected onto the working surface of the workstation;
   (ii) generate the prescribed image for the workstation based at least in part upon the real pixels from other workstations among said plurality of workstations in which the real pixels define the real image portion representing said real content on the working surface of other workstations among said plurality of workstations;
   (iii) identify the real pixels by comparing brightness of captured pixels among the image data captured by the camera of that workstation to a brightness threshold and determining the captured pixel to be a real pixel if the brightness is darker than the brightness threshold; and
   wherein the brightness threshold is defined as a gradient of brightness values associated with a respective column of the captured pixels whereby the captured pixels are compared to corresponding brightness values of the gradient in order to determine if the captured pixels are real pixels, the controller being arranged to calculate the brightness values of the gradient by extrapolating between an upper brightness value and a lower brightness value derived from captured pixels at opposing ends of the column of captured pixels.

2. The system according to claim 1 wherein the controller is arranged, for each workstation, to:
   (i) define groupings of the real pixels that are connected to one another as a real object on the working surface of the workstation; and
   (ii) generate the prescribed image for the workstation such that a blank image is projected onto the real object.

3. A collaborative distributed workspace system comprising:
   a plurality of workstations, each workstation comprising a working surface, a projector arranged to project a prescribed image for the workstation onto the working surface of the workstation, and a camera arranged to capture image data associated with the working surface of the workstation; and a controller comprising a workstation processing unit associated with each workstation;

wherein for each workstation, the controller is arranged to:

(i) process the captured image data associated with the working surface of the workstation to distinguish real pixels defining a real image portion representing real content on the working surface of the workstation within the image data captured by the camera of that workstation from projected pixels representing projected content that has been projected onto the working surface of the workstation;

(ii) generate the prescribed image for the workstation based at least in part upon the real pixels from other workstations among said plurality of workstations in which the real pixels define the real image portion representing said real content on the working surface of other workstations among said plurality of workstations;

(iii) compare captured pixels from the camera of the workstation to corresponding pixels of the prescribed image to be projected from the projector of the workstation to determine a brightness difference; and (iv) adjust the brightness threshold used to identify the real pixels if the brightness difference exceeds an ambient light threshold.

* * * * *